(12) United States Patent
Dunand et al.

(10) Patent No.: US 6,914,190 B2
(45) Date of Patent: Jul. 5, 2005

(54) SYSTEM FOR MODIFYING THE STRUCTURE OF AN ELECTRICAL HARNESS

(75) Inventors: Michel Dunand, Balma (FR); Sébastien Guerrero, Fronton (FR)

(73) Assignee: Labinal, Montigny-le-Bretonneux (FR)

( * ) Notice: Subject to any disclaimer, the term of this patent is extended or adjusted under 35 U.S.C. 154(b) by 0 days.

(21) Appl. No.: 10/765,161

(22) Filed: Jan. 28, 2004

(65) Prior Publication Data

US 2004/0256136 A1 Dec. 23, 2004

(30) Foreign Application Priority Data

Jan. 29, 2003 (FR) .............................. 03 00968

(51) Int. Cl.⁷ ................................ H01B 3/00
(52) U.S. Cl. ................ 174/72 C; 174/71 R; 174/72 A
(58) Field of Search ........................... 174/71 R, 72 A, 174/72 C, 73.1, 84 R, 88 C, 89

(56) References Cited

U.S. PATENT DOCUMENTS

| | | | | |
|---|---|---|---|---|
| 701,208 A | * | 5/1902 | Luke ........................ | 174/71 R |
| 2,036,414 A | * | 4/1936 | Bjorn ........................ | 174/73.1 |
| 2,299,140 A | * | 10/1942 | Hanson ..................... | 174/72 A |
| 2,933,550 A | * | 4/1960 | Cole et al. ................. | 174/72 A |
| 4,415,217 A | * | 11/1983 | Clabburn et al. .......... | 174/72 R |
| 4,423,311 A | * | 12/1983 | Varney, Sr. ................ | 174/71 R |
| 4,755,241 A | * | 7/1988 | Steinberg .................. | 174/71 R |
| 5,091,604 A | | 2/1992 | Kirma | |
| 5,126,507 A | | 6/1992 | Kirma | |
| 5,444,182 A | * | 8/1995 | Hoshino .................... | 174/72 R |
| 5,917,151 A | * | 6/1999 | O'Brien et al. ........... | 174/72 A |
| 5,973,265 A | * | 10/1999 | O'Brien et al. ........... | 174/72 R |
| 6,255,584 B1 | * | 7/2001 | Renaud ..................... | 174/71 R |
| 6,259,027 B1 | * | 7/2001 | Watanabe .................. | 174/72 A |
| 2002/0179318 A1 | | 12/2002 | Seo | |

\* cited by examiner

*Primary Examiner*—Eric W. Thomas
*Assistant Examiner*—Adolfo Nino
(74) *Attorney, Agent, or Firm*—Oblon, Spivak, McClelland, Maier & Neustadt, P.C.

(57) ABSTRACT

A modification system for modifying a tightly-braided electrical harness including at least one conductor cable bundle surrounded by a tight braid. The modification system includes: at least one modification conductor element constituted by at least one conductor cable surrounded by a shielding braid; and at least one spare sheath portion comprising a flexible tube portion mounted in part inside the braid of said harness in such a manner that a first end of said tube extends beyond the end of said harness braid and that the second end of the tube is external to said harness braid, passing through it, at least said portion of the tube that is external to the harness braid being surrounded by a tight braid.

7 Claims, 4 Drawing Sheets

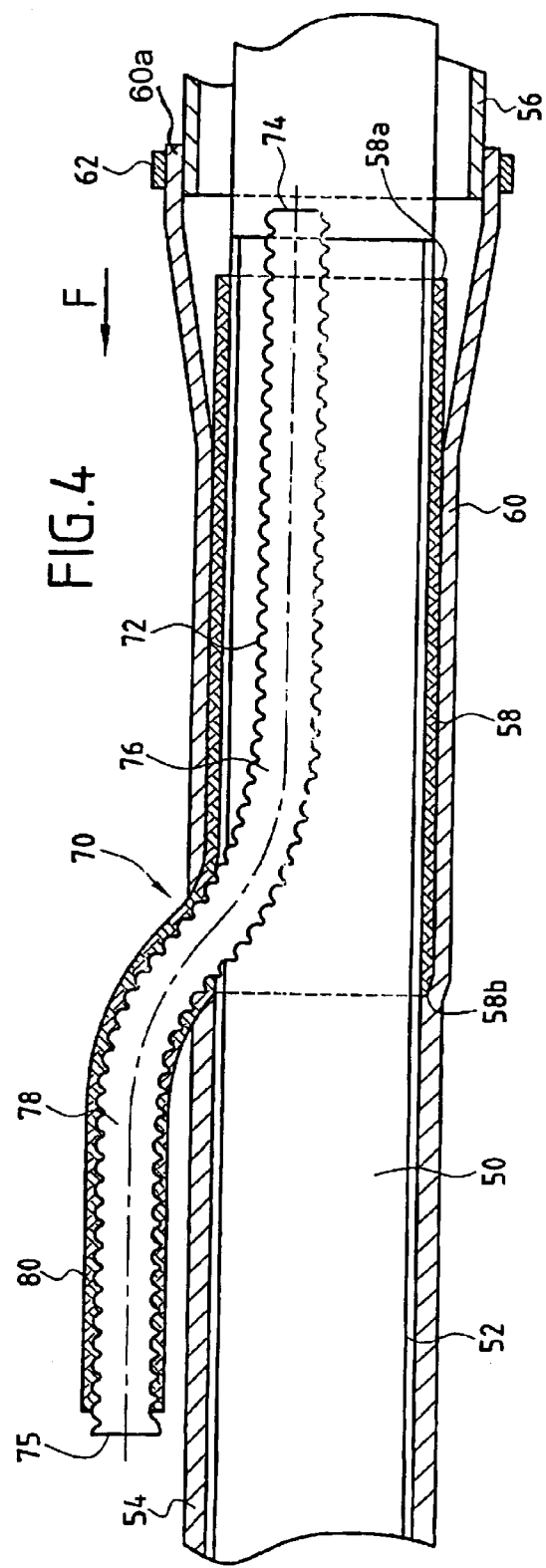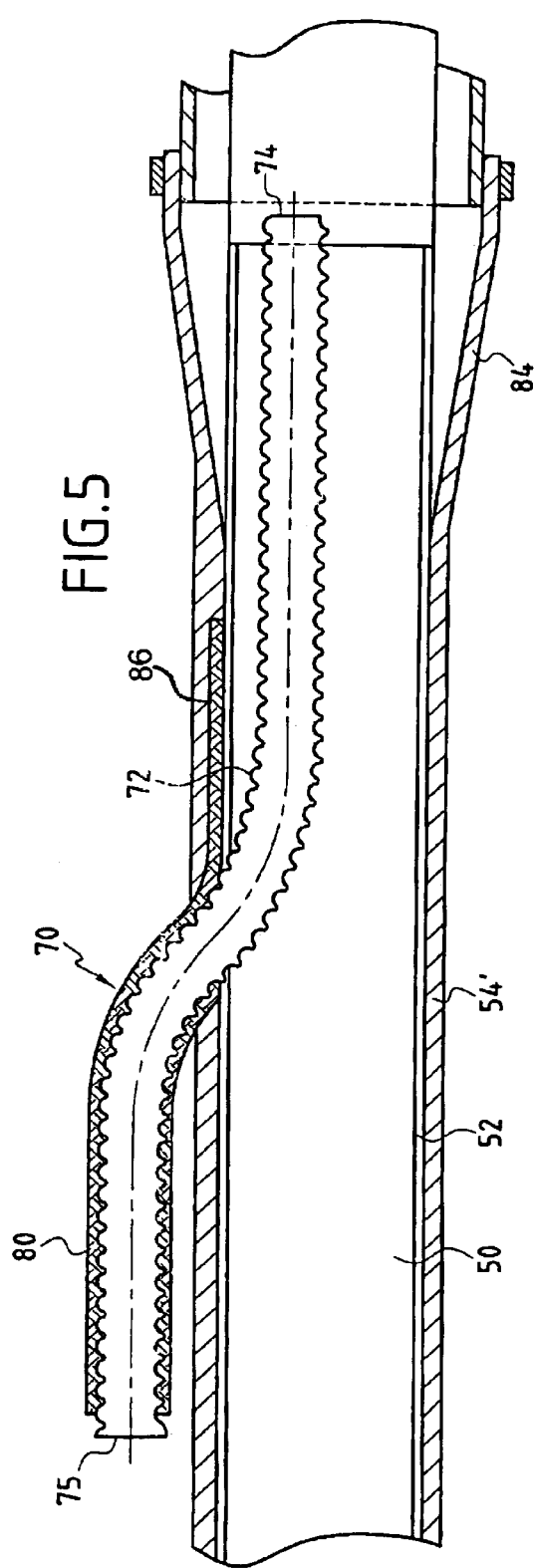

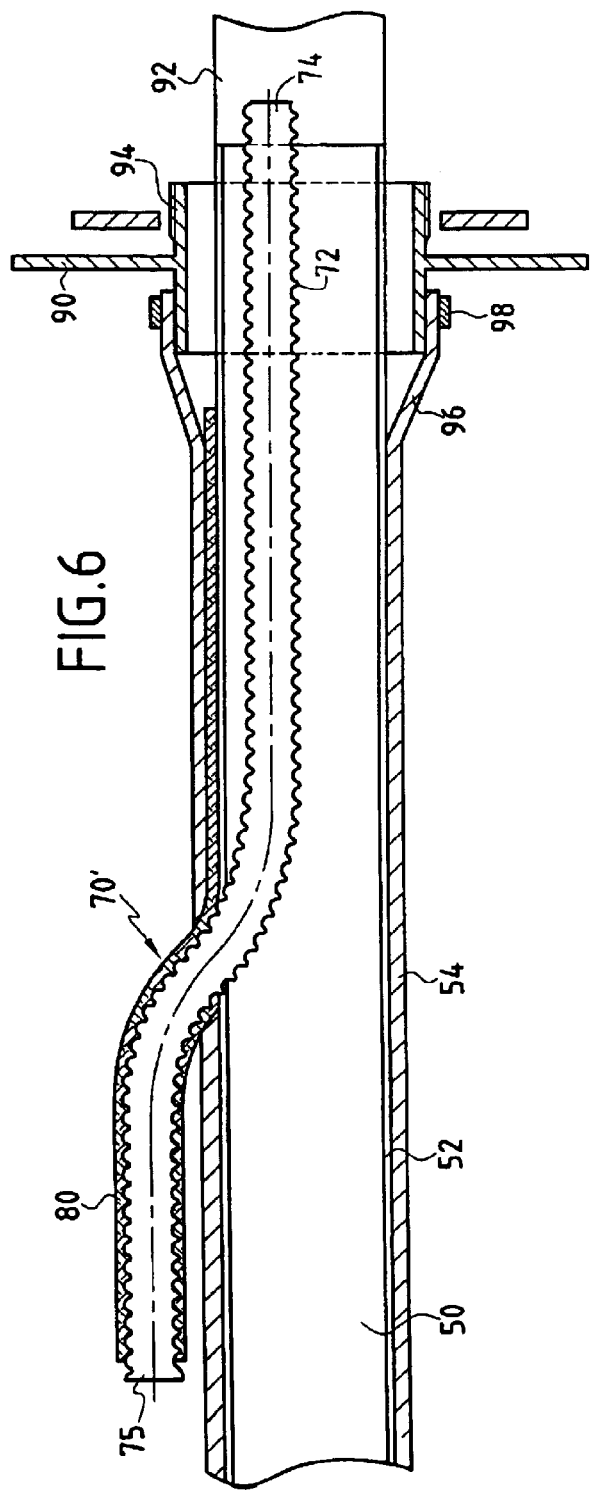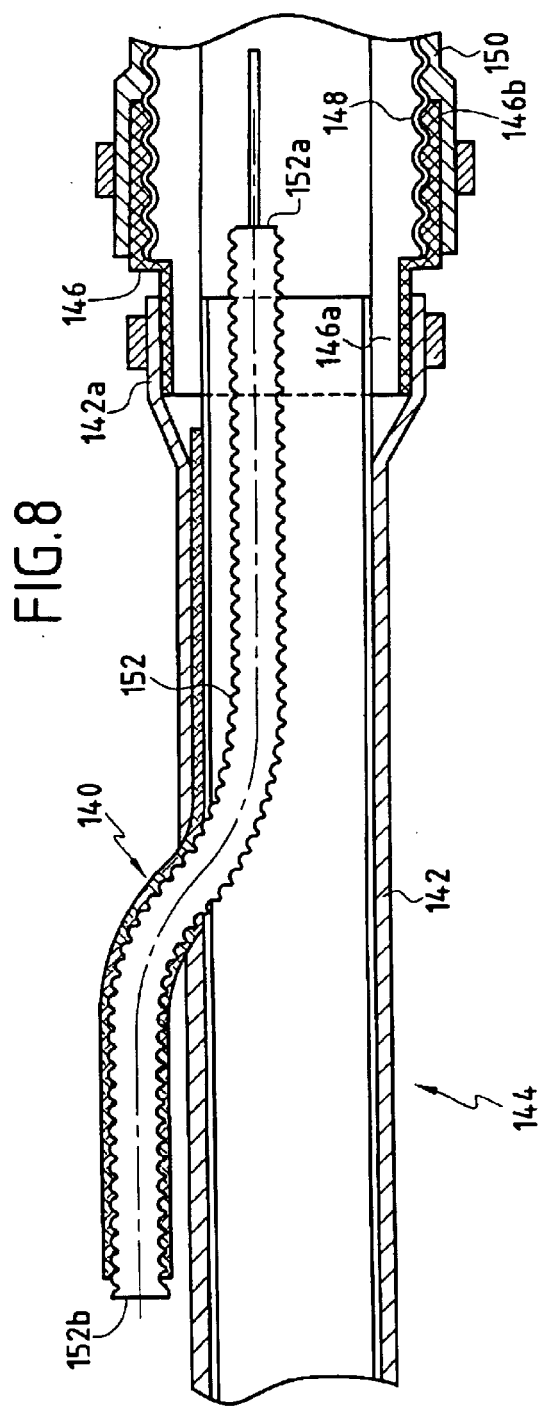

SYSTEM FOR MODIFYING THE STRUCTURE OF AN ELECTRICAL HARNESS

The present invention relates to a system for modifying the structure of a tightly-braided electrical harness, where modification can consist either in repairing the harness or in adding conductor cables to those that already exist in the harness.

The invention also provides a tightly-braided electrical harness that can be modified by adding at least one conductor cable.

BACKGROUND OF THE INVENTION

An electrical harness is a set of electric wires of various gages, optionally shielded, that extend together and terminate at connectors. The set of electric wires or cables constitutes a bundle.

The harness is said to be shielded when a conductor, e.g. constituted by a shielding braid, surrounds the entire harness and any branch connections all the way up to the connector.

A harness is said to be tightly braided when the shielding braid(s) is/are in intimate contact with the conductor elements or cables forming the harness bundle.

As a general rule, the harness comprises a main bundle and branches constituting secondary bundles. In addition, the harness may pass through conductive walls or partitions. Under such circumstances, the shielding of the harness needs to be connected to such conductive partitions.

On a secondary branch, or on a main bundle, the harness may include a transition, i.e. a shielding element that enables tight braiding on one side of the transition to be connected to a shielded duct on the other side.

In some cases, it may be necessary to add new conductor wires to those already present in the harness, either to repair a harness that is damaged, or to add cables to the initial harness, thereby making it possible to include additional functions in the harness.

In the present specification, the term "modifying" the harness is used to mean adding new electric cables to those that already exist in the harness, such addition being justified either by the harness being damaged or by new functions being added thereto.

In order to enable an electrical harness to be modified, it is known to provide certain branches of the harness with spare sheaths, i.e. with tubes that enable electric cables to be added to the bundle already existing in the harness and that extend over the full length of the harness. Under such circumstances, the harness is said to be "modifiable" since it is then possible to add cables to an initial harness without making any modifications other than introducing the cables into the spare tube.

To duplicate a damaged cable or to include additional functions in a harness having tight braiding or in a tightly-braided portion of a shielded harness that is not fitted with spare sheaths, it is common practice to use a shielding kit. A shielding kit is a shielded harness that is not fitted with connectors and that is designed to be installed together with the portion of the harness that is to be modified. The kit contains only those cables that are needed for modification purposes. The shielding of the kit is terminated at its ends by respective braid portions commonly referred to as "pigtails" which serve to establish continuity of shielding between the braid of the harness and the braid of the shielding kit. Nevertheless, mounting such a shielding kit on the harness is a lengthy procedure and runs the risk of spoiling the quality of shielding provided by the braid.

It will thus be understood that the problem is particularly difficult to solve at the connectors of the harness, at places where the harness passes through conductive walls, at branch connections, and at transitions.

OBJECTS AND SUMMARY OF THE INVENTION

A first object of the present invention is thus to provide a system for modifying an electrical harness with tight braiding that enables the harness to be modified without requiring lengthy or complex operations and without spoiling the quality of the shielding that is constituted essentially by the outer braid of the harness.

To achieve this object, the invention provides a system for modifying a tightly-braided electrical harness comprising at least one bundle of conductor cables surrounded by a tight braid, and at least one end of said braid. Said modification system comprises:

at least one modification conductor element constituted by at least one conductor cable surrounded by a shielding braid, said braid presenting two ends, and the conductor cable projecting beyond both ends of the braid;

at least one portion of spare sheath comprising a flexible tube portion mounted in part inside the braid of said harness so that a first end of said tube opens out beyond the end of said harness braid, and so that the second end of the tube is external to said braid of the harness, passing through it, at least said portion of the tube that is external to the braid of the harness being surrounded by a tight braid; and braid connection means for connecting the end of the braid of the modification conductor element to the end of the braid surrounding the external portion of said tube, said conductor cable of the modification conductor element being engaged in said tube and projecting from the first end of said tube.

It will be understood that by putting a short length of spare sheath into place at the ends of the outer braid of the harness or of certain branches of the harness, said ends of the shielding braid corresponding to a connector, to a feedthrough through a conductive wall, to a branch connection, or to a transition, it is possible to install modification electrical elements corresponding to the above-described shielding kit without spoiling the shielding braid of the harness or the various branches of the harness and without needing to perform operations that are complex. The internal braid of the spare sheath is easily connected to the braid of the modification conductor element and the conductor wire of the modification conductor element can easily be inserted into the tube of the spare sheath.

In a preferred embodiment, the modification conductor element or shielding kit further comprises a flexible tube along which the conductor wire is passed and on which the shielding braid is formed.

Another object of the invention is to provide an electrical harness presenting characteristics making it easy to put modification conductor elements into place.

The tightly-braided electrical harness that is modifiable by adding at least one electric cable comprises at least one bundle of conductor cables surrounded by tight braiding and at least one end of said braid. The harness further comprises:

at least one portion of spare sheath comprising a flexible tube portion mounted in part inside the braid of said harness in such a manner that a first end of said tube extends beyond the end of said harness braid and that the second end of the tube is external to said harness braid, at least said portion of the tube that is external to the harness braid being surrounded by a tight braid, whereby a modification conductor element is suitable for being connected to said second end of the spare sheath portion.

BRIEF DESCRIPTION OF THE DRAWINGS

Other characteristics and advantages of the invention appear better from reading the following description of various embodiments of the invention given as non-limiting examples. The description refers to the accompanying figures, in which:

FIG. 4 is a longitudinal section view showing a first embodiment of a harness in a zone for fixing to a connector;

FIG. 5 shows a variant of the embodiment shown in FIG. 4;

FIG. 6 is a longitudinal section view of an embodiment of a harness in the zone where it passes through a partition;

FIG. 8 is a longitudinal section view showing an embodiment of a harness in a transition zone.

MORE DETAILED DESCRIPTION

Figure 1:
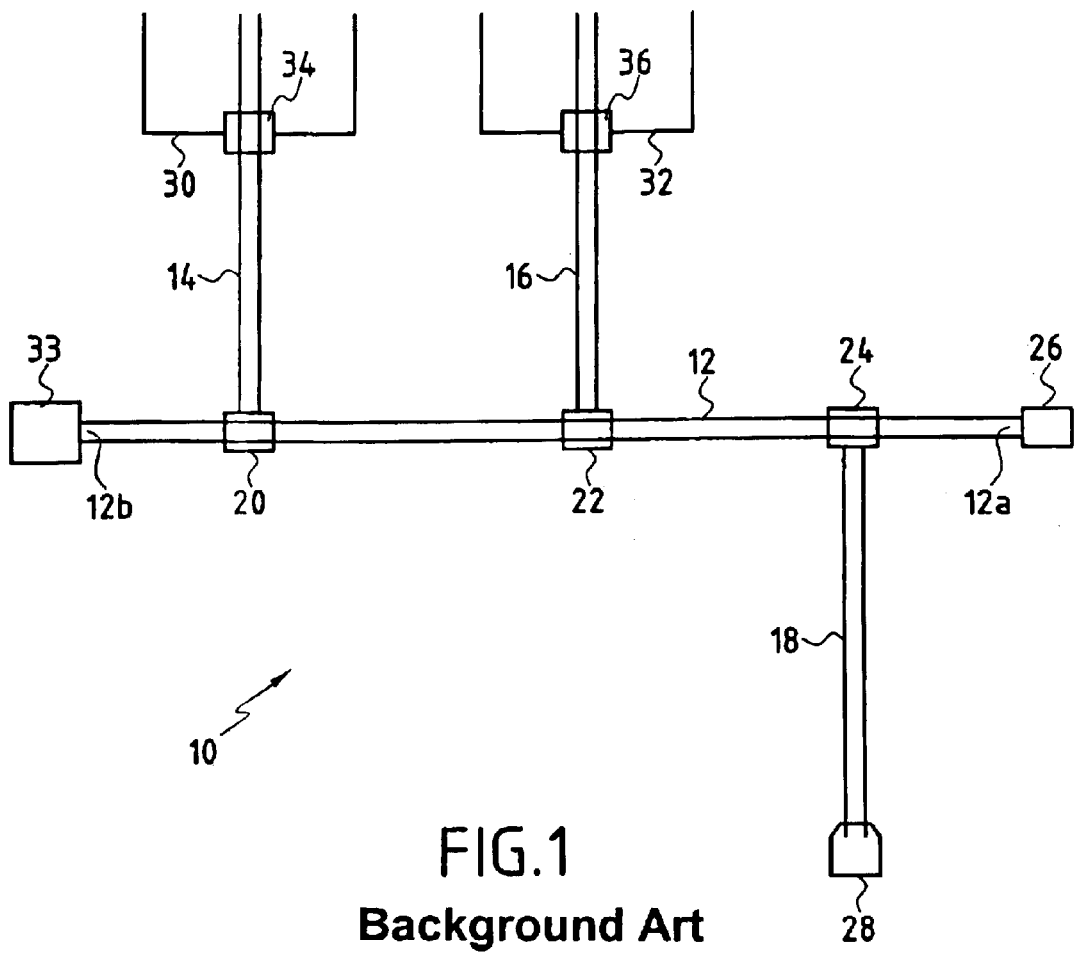
FIG. 1 shows an example of an electrical harness.

Reference is made initially to FIG. 1 while describing an embodiment of an electrical harness.

The harness 10 comprises a main conductor 12 and secondary branches 14, 16, and 18. The secondary branches may be connected to the main conductor by branch connections 20, 22, and 24. In the example shown, the end 12a of the main conductor is wired to a connector 26 and the end of the branch 18 is wired to a connector 28. The branches 14 and 16 pass through partitions 30 and 32 via feedthroughs 34 and 36, and the end 12b passes through a transition 33.

Figure 2:
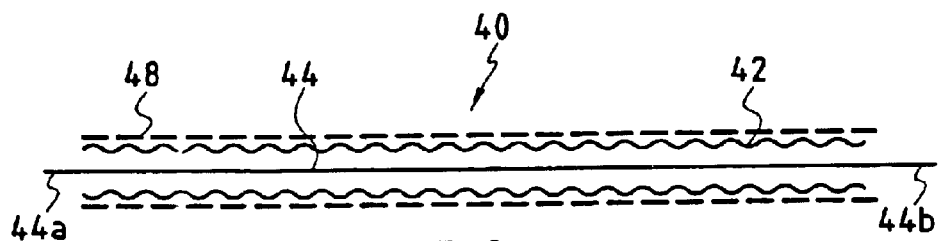
FIG. 2 is a longitudinal section through a modification conductor element or "shielding kit"

As explained above, the invention consists in locally fitting the main conductor 12 or the branches such as 14, 16, and 18 with spare sheaths, in particular in the zones where they connect with a connector, in zones passing through a wall, or in the branch connection zones. As explained in greater detail below, the end of the spare sheath is designed to be connected to a modification conductor element 40 or shielding kit. As shown in FIG. 2, the modification conductor element is constituted by a flexible tube 42 whose outside wall is optionally corrugated in order to stiffen it while still allowing it to deform in bending. Inside this tube 42, there is placed a conductor cable or a plurality of conductor cables such as 44 whose ends 44a, 44b project beyond the ends of the tube 42. On the outside face of the tube 42 there is formed a shielding braid 48 which extends over the entire length of the tube 42.

With reference initially to FIG. 4, there follows a description of implementing the invention in the harness at a point where a connector is wired thereto.

In FIG. 4, there can be seen the twisted bundle 50 of harness cables optionally covered in a protective tape 52, with a shielding braid 54 formed over the main portion thereof to provide tight braiding on this portion of the harness. This figure also shows the rear coupling 56 of the connector (not shown). In the cabling zone of the harness and in this first embodiment, an under braid 58 is made on the bundle, with the end 58a of this under braid terminating before, but preferably within the rear coupling of the connector. The main portion of the braid 54 is extended by a "sock-forming" braid portion 60 covering the under braid 58. The under braid 58 has a rear end 58b from which it is covered by the sock 60. The free end 60a of the sock 60 is fixed to the rear coupling 56 of the connector by a metal banding strip 62.

The under braid 58 constitutes tight braiding for the harness while the sock 60 can be deformed so as to enable the rear coupling 56 to be moved in the direction of arrow F, thus enabling the cables in the bundle 50 to be wired to the connector.

In the invention, the end of the harness is fitted with a spare sheath given overall reference 70. This spare sheath 70 is constituted essentially by an optionally-corrugated flexible tube 72 having a first end 74 opening out beyond the end 58a of the under braid 58 and having a second end 75 disposed outside the braid 58 of the harness. The tube 72 thus passes through the braid 54 so as to constitute an internal portion 76 and an external portion 78. The external portion 78 is covered by a shielding braid 80 which is electrically connected to the under braid 58 and to the sock 60. Thus, the internal portion. 76 of the tube 72 lies inside the under braid 58 which surrounds the end of the harness and is thus mechanically secured to the bundle of the harness.

When it is desired to add one or more electrical cables to the harness cable that is connected to the connector, it suffices to use a modification conductor element 40 of the type shown in FIG. 2, to introduce the end 44b of its conductor cable into the tube 72 so that it projects beyond the end 74 of said tube, thus enabling it to be wired to the connector, and to connect the braid 42 of the element 40 electrically to the braid 80 of the spare sheath.

Figure 3:
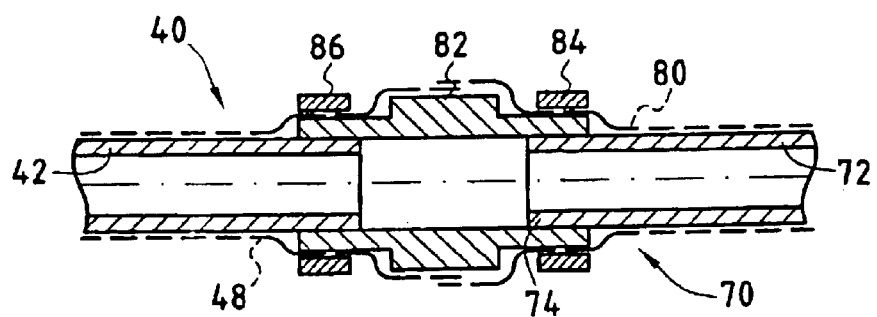
FIG. 3 shows the connection between a modification conductor element and a spare sheath.

For the purpose of interconnecting braids, it is possible to use an extender of the type shown in FIG. 3, the extender 82 is constituted by a conductive cylinder having mechanically engaged therein the end of the tube 72 that constitutes the spare sheath and the end of the tube 42 of the element 40 (shielding kit). In addition, the ends of the shielding braids 48 and 80 of the spare sheath and of the element 40 are connected to each other via the extender 82 and metal clamping strips such as 84 and 86. Naturally, other means could be used for electrically connecting the shielding braid of the spare sheath to the shielding braid of the modification conductor element 40.

FIG. 5 shows a variant embodiment of the harness of the invention in its zone for wiring to a connector. This embodiment differs from the embodiment shown in FIG. 4 essentially by the fact that the shielding of the connection end of the harness is provided solely by means of the sock 84 which constitutes an extension of the shielding braid 54' of the main portion of the harness. The spare sheath 70 is identical to that of FIG. 4 with the exception that the shielding braid 80 of the spare sheath 72 includes a "pigtail" 86 which is electrically connected to the shielding braid forming the sock 84.

FIG. 6 shows an embodiment of the electrical harness in a zone where it passes through a wall 90. To the left of the wall 90, the hardness comprises a shielding braid 52 identical to that of FIG. 4, whereas the portion of the harness 92 on the right of the wall 90 is unshielded.

The wall 90 includes a feedthrough tube 94 in which the harness is engaged. The shielding braid 52 of the harness has a larger-diameter portion 96 which is fixed to the feedthrough tube 94 by a banding strip 98. The spare sheath (which is referenced 70') is identical in structure to the sheath shown in FIG. 5. It should merely be observed that the first end 74 of the spare sheath tube 72 extends beyond the wall 90 for the purpose of being connected to a first end of a first modification conductor element 40 of the type shown in FIG. 2, whereas the external second end 75 of the tube 72 is for connection to a second modification conductor element.

Figure 7:
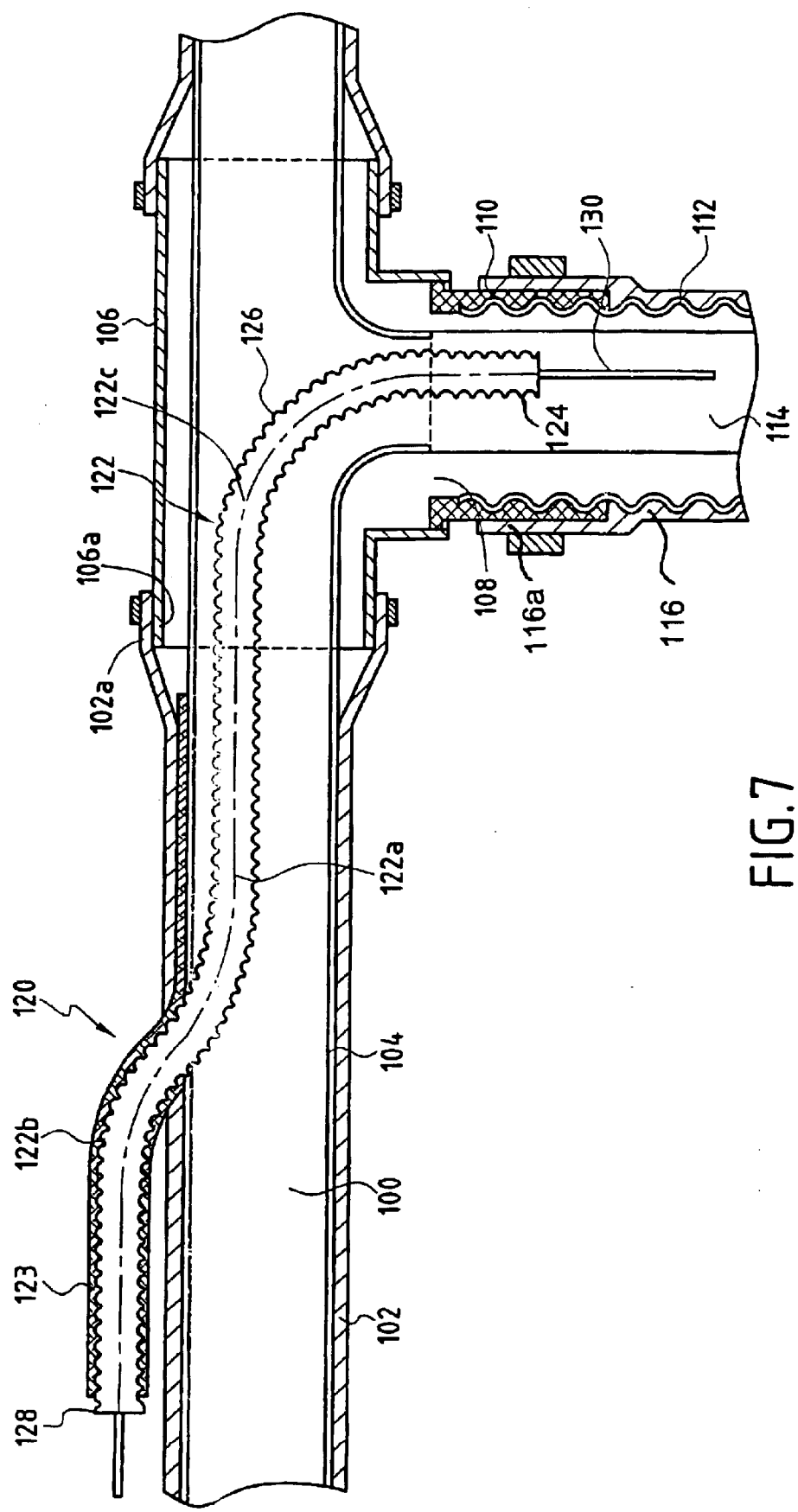
FIG. 7 is a longitudinal section view of an example of a harness in a branching zone.

FIG. 7 shows an embodiment of a harness in accordance with the invention in a branch connection zone.

This figure shows the cable bundle 100, the tight braiding 102, and the protective tape 104 of the main conductor of the harness. There can also be seen the branch-connection piece 106 through which the main conductor of the harness passes. An enlarged end 102a of the braid 102 is fixed on a first end 106a of the branch-connection piece 106.

The branch-connection piece 106 has a side opening 108 to which there is fixed the adapter 110 of the duct 112 for the branch 114 of the harness. The adapter 110 also has fixed thereto the end 116a of the braid 116 of the branch 114.

In a manner similar to that described above, the harness is provided with a spare sheath portion 120 close to the end 102a of the braid 102. The spare sheath 120 is constituted by a flexible tube 122. The middle portion 122a of the tube is inserted in the end of the braid 102. Its first end portion 122b passes through the braid 102 and thus lies outside the harness. It is surrounded by a braid 123. Finally, its second end portion 122c leaves the braid 102 and terminates in the branch-connection piece 106, and its end 124 opens out into the duct 112 of the branch 114 after a bend 126.

The external end 128 of the spare sheath 120 is for connection to one end of a modification conductor element or shielding kit 40 of the type shown in FIG. 2. Connection may be implemented by means of an extension of the type shown in FIG. 3.

It is also possible to provide a pull needle 130 in the tube 122 so as to make the electrical cable of the modification conductor element 40 easier to introduce into the tube 122.

FIG. 8 shows a portion of spare sheath 140 in place close to the end 142a of the shielding braid 142 of harness 144. The end 142a is fixed to the first end 146a of a transition piece 146. A duct 148 and its shielding braid 150 are fixed to the second end 146b of the transition piece 146.

The internal end 152a of the tube 152 of the spare sheath 140 opens out into the transition piece 146 beyond the end 142a of the braid 142. The end 152b of the tube 152 is for connection to one end of a modification conductor element or shielding kit 40.

What is claimed is:

1. A harness modification system for modifying a tightly-braided electrical harness comprising at least one bundle of conductor cables surrounded by a tight braid, said braid having at least one end, said modification system comprising:

at least one modification conductor element including at least one conductor cable surrounded by a shielding braid, said shielding braid presenting two ends, and the conductor cable projecting beyond both ends of the shielding braid;

at least one portion of spare sheath comprising a flexible tube portion mounted in part inside the braid of said harness so that a first end of said tube opens out beyond the end of the braid of said harness, and so that the second end of the tube is external to the braid of said harness, passing through it, at least said portion of the tube that is external to the braid of the harness being surrounded by a tight braid; and braid connection means for connecting the end of the shielding braid of the modification conductor element to the end of the braid surrounding the external portion of said tube, said conductor cable of the modification conductor element being engaged in said tube and projecting from the first end of said tube.

2. A harness modification system according to claim 1, wherein the modification conductor element further comprises a flexible tube on which said braid is mounted and in which said conductor cable is engaged.

3. A harness modification system according to claim 1, wherein the end of the harness braid corresponds to one end of the harness cable bundle, said end being for mounting on an electrical connector.

4. A harness modification system according to claim 3, wherein the end of the harness braid comprises a first braid surrounding the cable bundle and in which there is placed said spare sheath, and a second braid that is movable relative to the first braid and that presents a first end electrically connected to the first braid and a second end that is movable for connection to the coupling of the connector, said spare sheath tube leaving said first braid beyond the first end of said second braid.

5. A harness modification system according to claim 1, wherein the end of the harness cable bundle extends beyond said end of the harness braid.

6. A tightly-braided electrical harness that is modifiable by adding at least one electrical cable, said harness comprising at least one conductor cable bundle surrounded by a tight braid and at least one end of said braid, said harness further comprising:

at least one portion of spare sheath comprising a flexible tube portion mounted in part inside the braid of said harness in such a manner that a first end of said tube extends beyond the end of said harness braid and that the second end of the tube is external to said harness braid, at least said portion of the tube that is external to the harness braid being surrounded by a tight braid, whereby a modification conductor element is suitable for begin connected to said second end of the spare sheath portion.

7. A harness according to claim 6, presenting a plurality of braid ends, at least some of said braid ends being fitted with respective spare sheath portions.

* * * * *